United States Patent

Nakano

[11] Patent Number: 5,805,727
[45] Date of Patent: Sep. 8, 1998

[54] IMAGE RECOGNITION METHOD AND APPARATUS

[75] Inventor: Hiroki Nakano, Otsu, Japan

[73] Assignee: International Business Machines Corporation, Armonk, N.Y.

[21] Appl. No.: 567,221

[22] Filed: Dec. 5, 1995

[30] Foreign Application Priority Data

Dec. 5, 1995 [JP] Japan .................................. 6-301042

[51] Int. Cl.$^6$ .............................. G06K 9/46; G06K 9/66; G06K 9/36
[52] U.S. Cl. ......................... 382/195; 382/235; 382/250; 382/299
[58] Field of Search ..................................... 382/192, 209, 382/217, 218, 248, 250, 299, 253, 278, 235, 240, 181, 195

[56] References Cited

U.S. PATENT DOCUMENTS

| | | | |
|---|---|---|---|
| 5,249,053 | 9/1993 | Jain | 348/231 |
| 5,572,596 | 11/1996 | Wildes et al. | 382/117 |
| 5,619,598 | 4/1997 | Nagata et al. | 382/305 |

*Primary Examiner*—Jose L. Couso
*Assistant Examiner*—Ha Tran Nguyen
*Attorney, Agent, or Firm*—Ronald L. Drumheller

[57] ABSTRACT

A non-compressed template image is compared with compressed object images stored in a memory to find an object image corresponding to the template image. Each object image is DCT transformed and compressed according to JPEG algorithm such that the compressed image data includes DCT coefficients representing DC components which indicate average intensity or brightness of the respective block of the object image. The template image is processed to obtain average intensity for each of blocks corresponding in size to the blocks of the object image. Image recognition is performed by rough matching and fine matching. In the rough matching, the average intensity of the template image and the average intensity of the object image represented by the DC components are used to examine the degree of matching. When a maximum rough matching value is found, the object image is restored or decompressed and the fine matching is done with use of pixel intensity. The rough matching is carried out using DC components without restoration of the compressed image which involves an enormous amount of computations, and only the compressed image with the maximum rough matching value is restored. This reduces computation load and increases process speed.

10 Claims, 15 Drawing Sheets

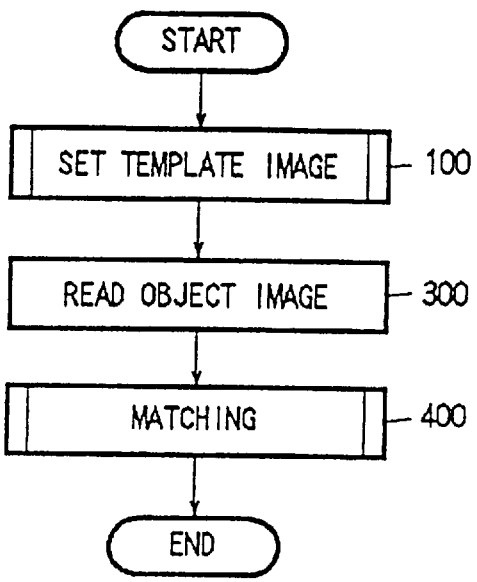
F I G. 3
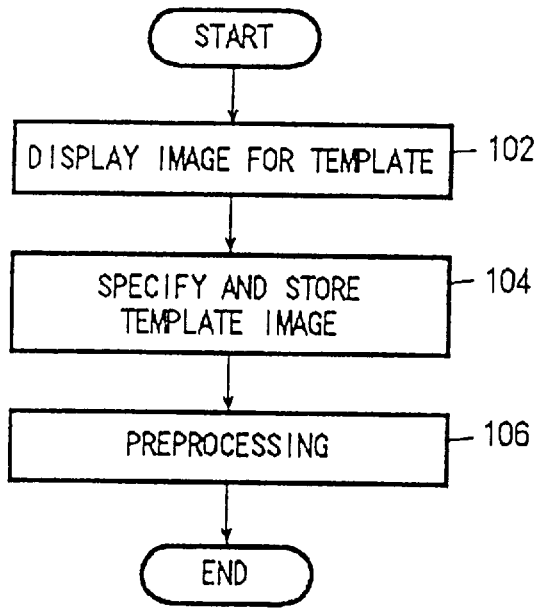
F I G. 4

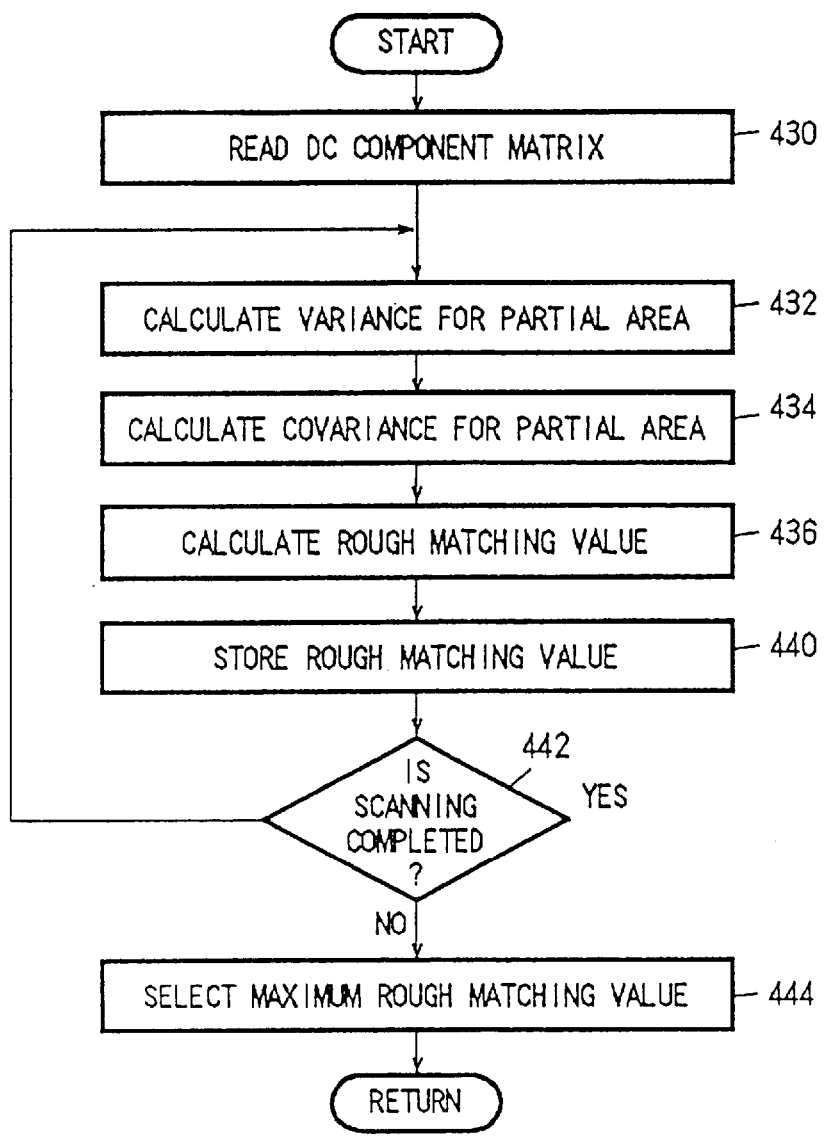
F I G. 6

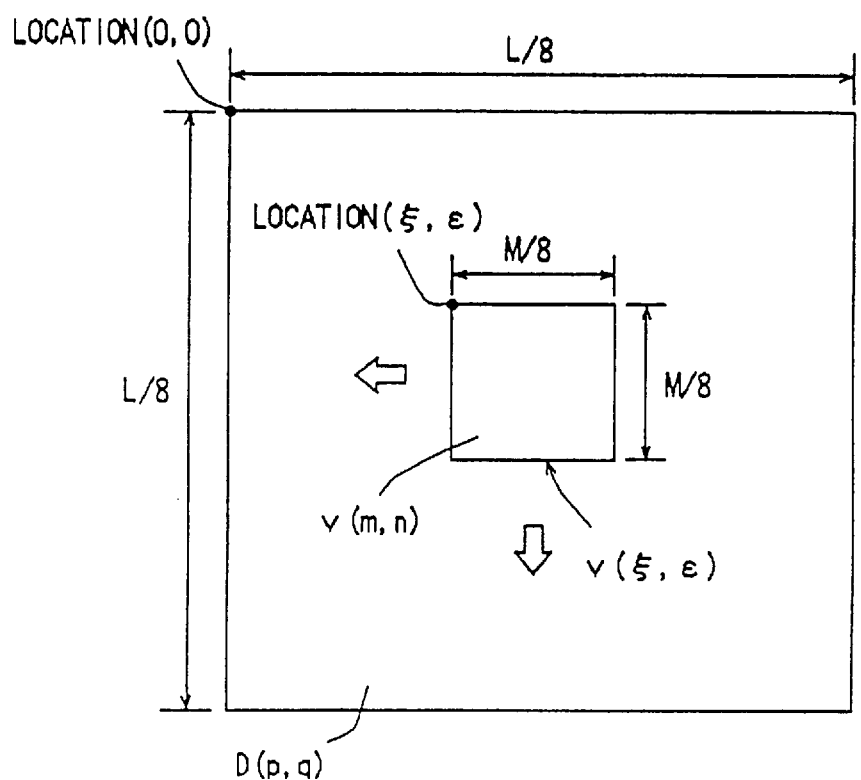
F I G. 1 2

IMAGE RECOGNITION METHOD AND APPARATUS

BACKGROUND OF THE INVENTION

1. Field of the Invention

The present invention relates to an image recognition method and an apparatus therefor, and more particularly to an image recognition method and an apparatus therefor that use compressed image data.

2. Related Art

With the recent progress in data processing technology, higher-speed central processing units (CPUs) for microcomputers and office computers have been being developed, and data storage units, such as hard disk drives (HDDs), have been growing in storage capacity. As a result, systems incorporating such computers have been able to readily store and reproduce pictures, using image information (hereinafter referred to as image data) representing color signals and gradation signals.

In an information age, image processing including high-speed and reliable searching are needed to obtain necessary images. Searching moving images consisting of sequential still images for necessary images increases the above-mentioned need.

Image recognition is an example of such image processing and finds use in various applications, such as recognizing an image pattern, searching object images for an image matching a set image, examining the quality of a tested portion by comparing the image of the portion with a plurality of standard images, and determining the location of a set image in an object image.

Since even one still image has a great amount of information, the image data of a still image are compressed to provide a reduced amount of image data (hereinafter called compressed image data). Compression of image data can increase the speed of data transmission and provide efficient storage of image data. Restoration or decompression of the compressed image data allows an original image to readily be reproduced or displayed.

Methods for obtaining compressed image data from a still image include the Joint Photographic Experts Group (JPEG) compression technique, wherein discrete cosine transform (DCT), one of orthogonal transform techniques, and Huffmann coding are used to compress still image data. For moving images, band compression by the Moving Picture Experts Group (MPEG) technique, wherein image data including audio information are compressed, is available.

To search images compressed by such techniques for a predetermined image, pattern matching between the images obtained by restoring the compressed data one after another and a reference image corresponding to the predetermined image is generally done.

As described above, in conventional image recognition methods, compressed image data are restored one by one. Pattern matching after restoration of each of the compressed images, therefore, increases computation load because of an enormous amount of computations involved in image restoration or decompression This leads to difficulty in increasing image processing speed.

An image searching system has been disclosed which separates image data compressed by the JPEG technique into a low-spatial frequency data portion and a high-spatial frequency data portion and displays a low-resolution image based on the low-spatial frequency data portion to roughly identify an image being searched for (refer to Japanese Published Unexamined Application (Patent Kokai) No. 05-2684840 (1993)). The image searching system synthesizes the low- and high-spatial frequency data portions to display in detail an intended image when it is found.

Although the image searching system reduces computation load, a user must visually determine whether an image displayed is of interest or not; that is, image recognition or image searching cannot automatically be performed.

SUMMARY OF THE INVENTION

In view of the foregoing, it is an object of the present invention to provide an image recognition method and an image recognition apparatus which enable computation load in image recognition to be reduced and an image to be automatically recognized at high speed.

The present invention provides an image recognition method for detecting matching between a non-compressed image and a compressed image stored in memory as image data which are compressed, using orthogonal transform into a two-dimensional spatial frequency region, so as to include, for each of blocks each comprising a predetermined number of pixels, a DC component corresponding to the average intensity of the respective block. The non-compressed image is divided into blocks corresponding in size to the blocks in the compressed image and the average intensity for each of the blocks is computed. On the other hand, the compressed image is processed to sequentially extract DC components for a plurality of partial areas from the compressed image data, which partial areas correspond in size to the non-compressed image. Rough pattern matching is done to compute a rough matching value indicative of the degree of matching between the non-compressed image and the compressed image. The rough pattern matching is performed based on the DC components of the partial areas and the average intensity of the blocks of the non-compressed image. A candidate area is determined on the basis of the rough matching value obtained, and compressed image data corresponding to the candidate area are restored to obtain candidate image data. Fine pattern matching is done to compute a fine matching value indicative of the degree of matching between the candidate image and the non-compressed image based on the image data for the candidate image and the image data for the non-compressed image. It is determined from the fine matching value whether or not the non-compressed image matches the compressed image.

The present invention also provides an image recognition apparatus implementing the above-described method.

According to the present invention, rough matching is performed with use of the DC components in compressed image data, and fine matching is performed only for the restored candidate image which is selected by the rough matching. Consequently, the amount of data processing required for restoration or decompression can be minimized, and moreover, matching between the non-compressed image and the compressed image can be efficiently done in a short time with a minimum of computation load.

BRIEF DESCRIPTION OF THE DRAWINGS

Referring now to the drawings, embodiments of the present invention are described in detail below.

FIG. 3 is a flowchart showing the flow through a main control routine according to the first embodiment;

FIG. 4 is a flowchart showing the flow through a routine for setting a template image;

FIG. 6 is a flowchart showing the flow through a routine for computing a rough matching value;

FIG. 12 is a view illustrating the concept of rough matching;

DESCRIPTION OF THE PREFERRED EMBODIMENTS

A first embodiment is an application of the present invention to an image recognition system in which a plurality of JPEG compressed object images are searched for an object image which is highly likely to include an object area corresponding to a non-compressed set image, which is input or predetermined by the operator, and in which the location of the object area in the object image is determined.

Figure 1:
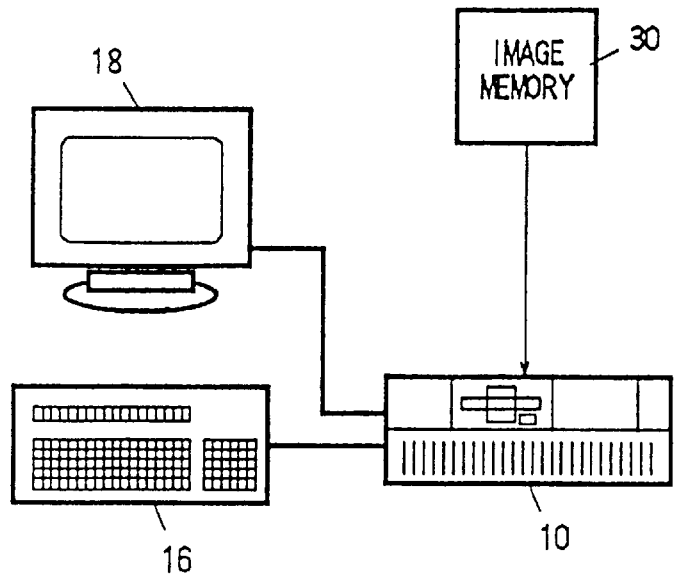
FIG. 1 is a configuration diagram showing an image recognition system according to the first embodiment.

As shown in FIG. 1, the image recognition system in the embodiment has a general-purpose personal computer 10, intended to control image recognition, which computer is connected to a keyboard 16 for data entry, a display 18 for displaying images and processing results, and image memory 30 in which a plurality of object images represented by image data compressed by the JPEG technique described later are stored as a still image file.

Figure 2:
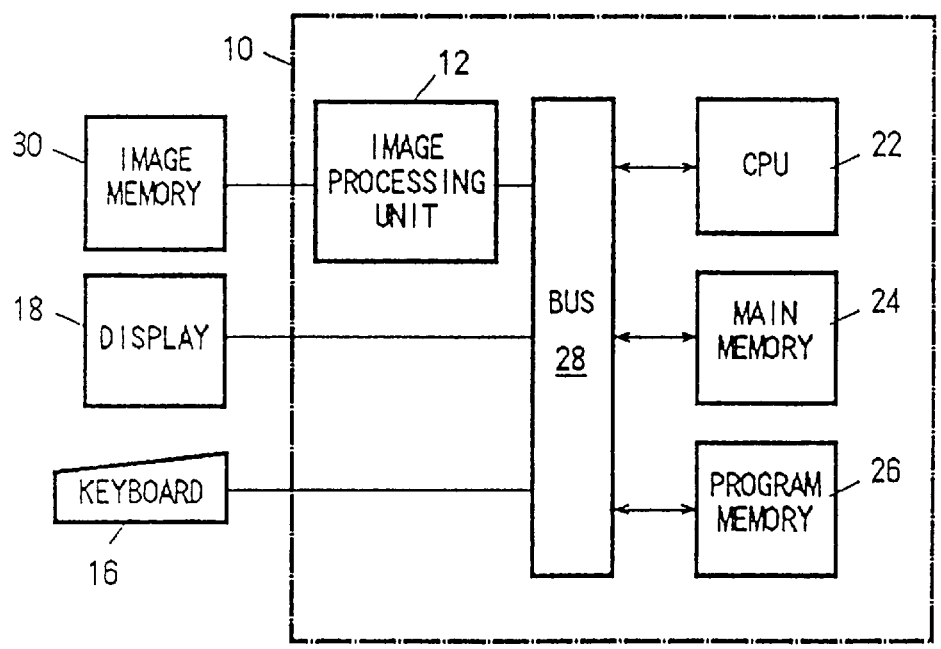
FIG. 2 is a block diagram showing functional connections in an image recognition system according to the first embodiment.

As shown in FIG. 2, the general-purpose personal computer 10 includes a CPU 22, main memory 24, and program memory 26. The CPU 22, main memory 24, and program memory 26 are connected to a bus 28, such as a PCAT bus or an SCSI bus. The bus 28 is connected with the display 18 and the keyboard 16. Block 12 shows an image processing unit capable of performing image compression in accordance with the JPEG algorithm.

Referring now to FIGS. 3 to 16, processing by the image recognition system in the embodiment is described below. When image recognition starts, the main control routine is executed to set a non-compressed template image or non-compressed set image in step 100.

The setting routine of FIG. 4 is used to set a template image. In the example, it is assumed that an area 52 (FIG. 8) is extracted from a reference image 50 displayed on the display 18 and is used as a non-compressed template image. In step 102 of FIG. 4, the reference image 50 is displayed on the display 18 [refer to FIG. 8A]. The reference image 50 can be displayed by reading non-compressed image data stored in the image memory 30. Of course, the non-compressed reference image 50 can be fed from any proper image data source.

Figure 8A:
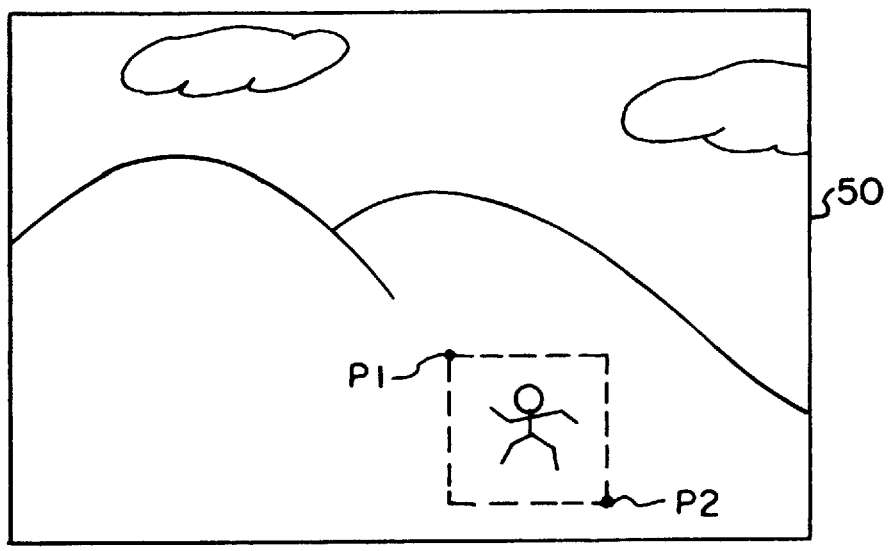
FIG. 8A shows a reference image.
Figure 8B:
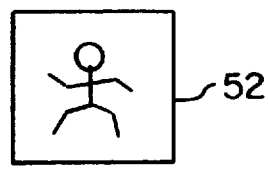
FIG. 8B shows a template image.

In the next step 104, a portion of the reference image 50 is specified to be set as a template image 52. In the example of FIG. 8A, a predetermined area (enclosed with a dotted line) including a person is set. The area for the template image 52 can be set by specifying two points [points p1 and p2 in FIG. 8A] on a diagonal with a pointing device (not shown), such as a mouse. Furthermore, in step 104, when the area for the template image 52 is set, the template image 52 is extracted from the reference image 50 [refer to FIG. 8B], and non-compressed image data S for the template image 52, i.e., all data on the intensity or brightness and color of individual pixels constituting the template image 52, are stored in the main memory 24.

The area for the template image 52 is set so that the number of pixels along the height and width of the area is multiples of eight to establish consistency with the JPEG technique described later. For the embodiment, the height and width of the template image 52 are assumed to have an equal length M (the unit of length corresponds to the size of a pixel; that is, the height and width of the template image 52 equal the length of a string of M pixels), and image data corresponding to the pixel positioned in the i-th column and j-th row in the template image 52 ($i \geq 0$, $j \geq 0$) are denoted as $S(i, j)$ to simplify the description below [refer to FIG. 11B].

The number of pixels along the height and width of each of object images 54 stored as a still image file (images to be searched for) is also assumed to be multiples of eight. For the embodiment, the height and width of the object image 54 have an equal length L (the height and width of the object image 54 equals the length of a string of L pixels), and image data corresponding to the pixel positioned in the i-th column and j-th row in the object image 54 is expressed as $W(i, j)$ [refer to FIG. 11A].

Alternatively, instead of the steps 102 and 104 for displaying the reference image 50 and extracting the template image 52 from the reference image 50, a predefined template image may be stored beforehand and read.

Figure 11B:
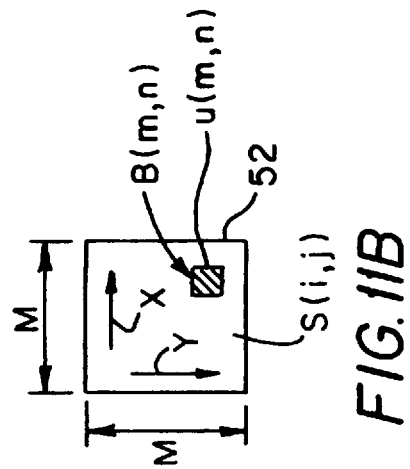
FIG. 11B illustrates a template image.
Figure 11A:
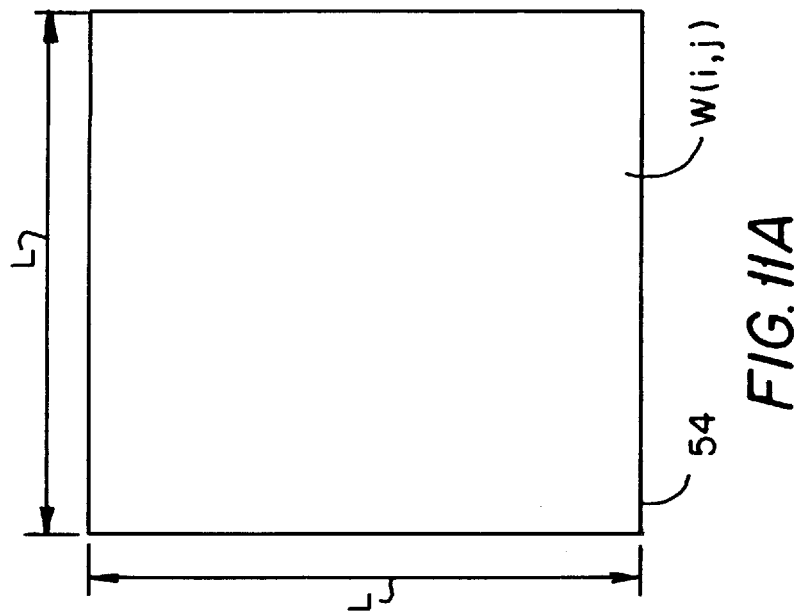
FIG. 11A illustrates an object image.

In the next step 106, the non-compressed template image 52 is pre-processed as follows:

As shown in FIG. 11B, the template image 52 is divided into blocks, 8-pixel×8-pixel each. With the block positioned in the m-th column ($m \geq 0$) (i.e., in the direction of X in the figure) from the left end and in the n-th row ($n \geq 0$) (i.e., in the direction of Y in the figure) from the upper end being denoted by block $B(m, n)$, pixel image data S in each block are used to compute the average intensity of each block, that is, the average intensity u (m, n) of block B (m, n), according to the following equation (1):

$$u(m,n) = \frac{\sum_{j=0}^{7} \sum_{i=0}^{7} S(m \cdot 8 + i, n \cdot 8 + j)}{8 \cdot 8} \quad \text{(Equation 1)}$$

Using the average intensity u (m, n) of each block, the average $\mu_u$ of the average intensities u (m, n) of the blocks of the template image 52 and the variance $\sigma_u^2$ representing variations in the average intensity u (m, n) of the blocks are computed according to the following equations (2) and (3) to obtain rough information on the template image 52.

$$\mu_u = \frac{\sum_{n=0}^{n\max} \sum_{m=0}^{m\max} u(m,n)}{m\max \cdot n\max} \quad \text{(Equation 2)}$$

$$\sigma_u^2 = \frac{\sum_{n=0}^{n\max} \sum_{m=0}^{m\max} \{u(m,n) - \mu_u\}^2}{m\max \cdot n\max} \quad \text{Equation 3}$$

where m max=n max=(M/8)−1.

Using image data S (i, j) on all pixels contained in the template image 52, the average $\mu_s$ of intensity and the variance $\sigma_s^2$ representing variations in the intensity of the pixels are computed according to the following equations (4) and (5) to obtain detail information on the template image 52.

$$\mu_s = \frac{\sum_{j=0}^{j\max} \sum_{i=0}^{i\max} S(i,j)}{i\max \cdot j\max} \quad \text{(Equation 4)}$$

$$\sigma_s^2 = \frac{\sum_{j=0}^{j\max} \sum_{i=0}^{i\max} \{S(i,j) - \mu_s\}^2}{i\max \cdot j\max} \quad \text{(Equation 5)}$$

where i max=j max=M−1.

After the setting of the template image 52 is completed as described above, an object image 54 is read in step 300 of FIG. 3. The object images 54, represented by compressed image data Φ as described later, are stored as a still image file in image memory 30. The object images in the still image file are compressed in accordance with the well-known JPEG image compression algorithm.

After performing DCT transform for each 8-pixel×8-pixel image area, the JPEG image compression algorithm carries out quantization and then reduces the amount of data by run-length coding and Huffmann coding to compress image data. The image data compression by DCT, though well-known, is outlined below.

An uncompressed input image is divided into 8-pixel×8-pixel blocks, for each of which DCT is performed. A transform equation for DCT can be given by the following equation (6), while inverse DCT transform (IDCT) is expressed by the following equation (7):

$$F(u,v) = \frac{1}{4} \sum_{i=0}^{7} \sum_{j=0}^{7} C(u) \cdot C(v) \cdot f(i,j) \cdot \quad \text{(Equation 6)}$$

$$\cos\left(\frac{(2i+1)u\pi}{16}\right) \cdot \cos\left(\frac{(2j+1)v\pi}{16}\right)$$

where
F (u, v): Transformed image (image data after DCT)
f (i, j): Input image (image data)
When u=0, C(u)=1/√2. When u≠0, C(u)=1.
When v=0, C(v)=1/√2. When v≠0, C(v)=1.

$$f(i,j) = \frac{1}{4} \sum_{u=0}^{7} \sum_{v=0}^{7} C(u) \cdot C(v) \cdot F(u,v) \cdot \quad \text{(Equation 7)}$$

$$\cos\left(\frac{(2i+1)u\pi}{16}\right) \cdot \cos\left(\frac{(2j+1)v\pi}{16}\right)$$

where
f (i, j): Input image (restored image)
F (u, v): Transformed image
When u=0, C(u)=1/√2. When u≠0, C(u)=1.
When v=0, C(v)=1/√2. When v≠0, C(v)=1.

Figure 9:
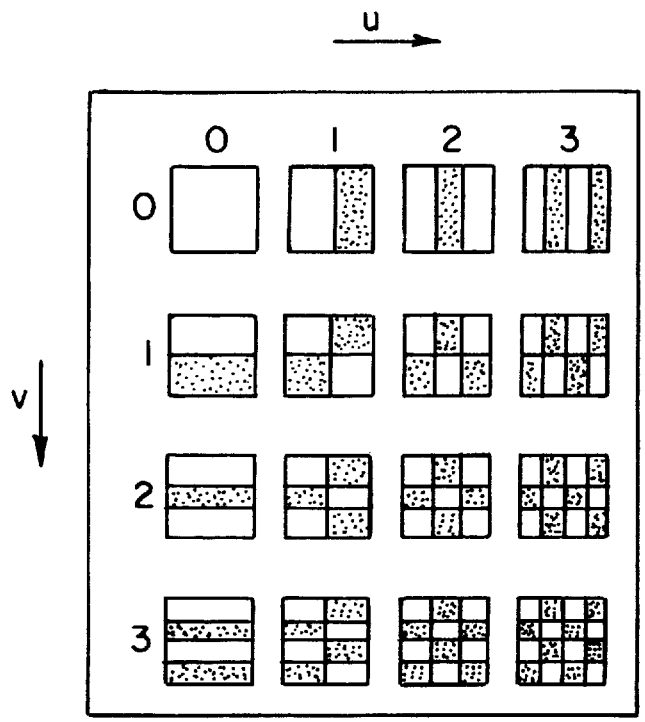
FIG. 9 is a conceptual view showing an example of a basic image related to DCT.
Figure 10:
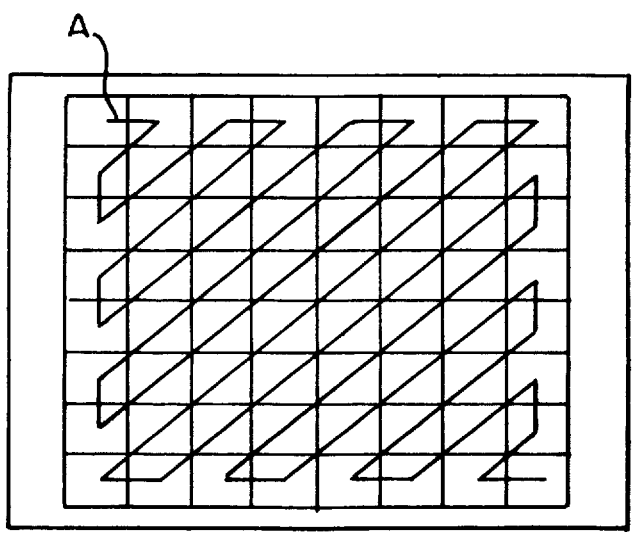
FIG. 10 is a view illustrating zigzag scanning of an object image when the object image is compressed.

As understood from the above equations (6) and (7), the transform is equivalent to classification by cosine multiplication for each spatial frequency. A function (basic function) used for the transform by cosine multiplication corresponds to a basic image for each spatial frequency, as shown in FIG. 9, where variables u and v correspond to spatial frequencies, and when u=0 and v=0, it represents a DC component. The spatial frequency increases with increasing values of u and v. As is clear from the above equation (7), the transformed image F provides a DCT coefficient for the basic image for each spatial frequency. Therefore, the transformed image F is represented by a DCT coefficient for each spatial frequency.

Generally, an input image f has higher energy in low-spatial frequency components than in high-spatial frequency components. By utilizing this characteristic, image data W of an input image f are quantized and compressed as follows:

Rough quantization is given to high-spatial frequency components, and the DCT coefficients are usually divided by predetermined values to reduce the number of data bits. As described above, an input image has low energy in high-spatial frequency components, and consequently, reducing the number of bits for data (coefficients) representing high-spatial frequency components does not have a marked effect on the result. Usually, a table including a value for each spatial frequency, which is commonly referred to as a "quantization table" or "Q table," is used to select the values for the division. As a result of the rough quantization, most of the DCT coefficients for high-spatial frequency components become zero. Since in run-length coding, a sequence of data "zeros" increases the compression ratio, zigzag scanning (indicated by an arrow A of FIG. 10) is done in run-length coding and Huffmann coding is performed. The well-known differential pulse code modulation (DPCM) is performed for the DC components (u=0, v=0) which represent the average intensity or brightness of the respective blocks. DPCM is a prediction coding technique, by which data on a pixel under consideration are predicted from already coded data on its surrounding pixels and the prediction error is coded. Compressed image data Φ for an input image are thereby obtained.

Compressed image data Φ are stored as a still image file in image memory 30. The compressed image data Φ are composed of DC coefficients, or DC components representing the average intensity, and DCT coefficients, or AC components having values dependent on the magnitude of spatial frequency.

Thus, in step 300, compressed image data Φ on an object image are read from the image memory 30 and transmitted to the main memory 24.

In step 400, matching is done between the object image 54 represented by the compressed image data Φ stored in the main memory 24 and the template image 52. In matching in the embodiment, the images are checked with use of variance and covariance, which are known in multivariate analysis.

Figure 5:
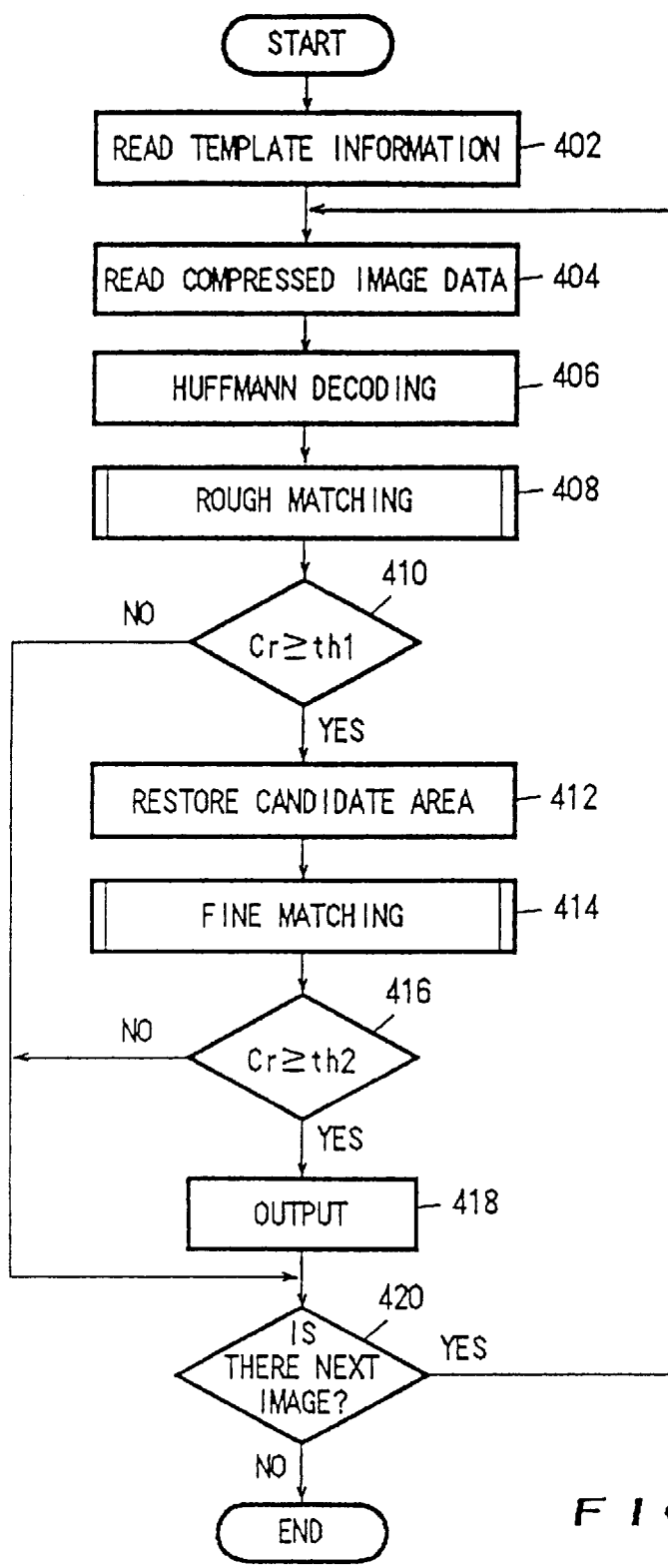
FIG. 5 is a flowchart showing the flow through an image matching routine.

The matching in step 400 is performed in accordance with the image matching routine of FIG. 5. In step 402, rough information (the average $\mu_u$ and the variance $\sigma_u^2$) and detail information (the average $\mu_s$ and the variance $\sigma_s^2$) are read, and in the next step 404, the compressed image data $\Phi$ stored in main memory 24 are read.

In the next step 406, only the DC coefficients included in the compressed image data $\Phi$ (DC coefficients corresponding to DC components) are subjected to Huffmann decoding. In the embodiment, when the object image 54 is searched for the template image 52, the size of the object image 54 is assumed to be L/8×L/8 as shown in FIG. 12. Since the object image 54 is compressed by the JPEG image compression algorithm for each 8-pixel×8-pixel image area (block), the compressed image data $\Phi$ include data on the average intensity of each 8-pixel×8-pixel image area equal in size to block B in the template image 52. When the average intensity of the object image 54 is dealt with, therefore, the object image 54 can be assumed to be of L/8×L/8 size. Huffmann decoding is given to DC coefficients included in the compressed image data $\Phi$ to obtain a quantization coefficient matrix $Q_{p,q}(u, v)$ represented by DC coefficients. The argument u, v and subscripts p and q ($p \geq 0$, $q \geq 0$) indicate the location of an image area (of 8-pixel×8-pixel size) in the object image 54. Then DC components are extracted from the quantization matrix $Q_{p,q}(u, v)$ and multiplied by values in the above-described quantization table to obtain a DC component matrix D (p, q). This transform causes only DC components to be Huffmann decoded, so that they are restored to DCT coefficients.

The DC component matrix D (p, q) represents average intensity. Being compressed for each 8-pixel×8-pixel image area as described above, the average intensity contained in the DC matrix D (p, q), of the respective image area represents the average intensity of each block area equal in size to block B in the template image 52. In the description below, the matrix value, or average intensity, in the DC component matrix D (p, q) is indicated by average intensity v (p, q).

In the next step 408, the DC component matrix D (p, q) and the rough information on the template image 52 are used to do rough pattern matching. As shown in FIG. 12, using the DC component matrix D (p, q), partial areas V of the object image 54, equal in size to the template image 52 (corresponding to M/8×M/8 size in the DC component matrix D), are successively scanned (for example, in the direction indicated by an open arrow of FIG. 12 to compute rough matching values Cr with respect to the average intensity and find a maximum of the rough matching value Cr. To find the maximum of the rough matching value is to determine a correlation between partial areas V ($\xi$, $\epsilon$), described later, in the DC component matrix D (p, q) and the template image 52. Computation of rough matching values is described in detail below.

The rough matching value computing routine of FIG. 6 can be used to find the maximum of the rough matching value Cr in step 408. In step 430 in FIG. 6, the DC component matrix D (p, q) is read. In the next step 432, the average intensity v (p, q) in the DC component matrix D (p, q) is used to compute the variance $\sigma_D^2$ of partial areas V of the same size (M/8×M/8) as the template image 52 according to the following equations (8) and (9). Namely, the location ($\xi$, $\epsilon$) of a partial area in the object image 54 (corresponding to L/8×L/8 size in the DC component matrix D) is set (FIG. 12). The variance $\sigma_D^2$ of the partial area V at the location ($\xi$, $\epsilon$) is computed. The partial area V at the location ($\xi$, $\epsilon$) is represented by the partial area V ($\xi$, $\epsilon$).

$$\mu_D = \frac{\sum_{n=0}^{n\max} \sum_{m=0}^{m\max} v(m,n)}{m\max \cdot n\max} \quad \text{(Equation 8)}$$

$$\sigma_D^2 = \frac{\sum_{n=0}^{n\max} \sum_{m=0}^{m\max} \{v(m,n) - \mu_D\}^2}{m\max \cdot n\max} \quad \text{(Equation 9)}$$

where v (m, n)=v ($\xi$+m, $\epsilon$+n)
n max=m max=(M/8)−1
$0 \leq \xi \leq L/8 - M/8$
$0 \leq \epsilon \leq L/8 - M/8$ In the next step 434, the average intensity u (m, n) of the template image 52 is used to compute a covariance $\sigma_{Du}^2$ for the partial area V ($\xi$, $\epsilon$) according to the following equation (10):

$$\sigma_{Du}^2 = \frac{\sum_{n=0}^{n\max} \sum_{m=0}^{m\max} \{v(m,n) - \mu_D\}\{u(m,n) - \mu_u\}}{m\max \cdot n\max} \quad \text{(Equation 10)}$$

In step 436, the variance $\sigma_D^2$ and covariance $\sigma_{Du}^2$ of the partial area V ($\xi$, $\epsilon$) are used to compute, according to the following equation (11) a rough matching value Cr with respect to the average intensity for the partial area V ($\xi$, $\epsilon$) in the block.

$$Cr = \frac{\sigma_{Du}^2}{\sqrt{(\sigma_u^2 \sigma_D^2)}} \quad \text{(Equation 11)}$$

Equation (11) means a correlation represented by an evaluation function indicating similarity in intensity or brightness between images. A simple evaluation function D can be expressed by the following equation (12):

$$D = \sum_{n=0}^{n\max} \sum_{m=0}^{m\max} \{v(m,n) - u(m,n)\}^2 \quad \text{(Equation 12)}$$

The smaller the value of equation (12), the higher the similarity. The value of the evaluation function D, however, tends to increase with greater variance $\sigma_u^2$ or $\sigma_D^2$. When equation (12) is normalized by average and variance to broaden the range of similarity between two images in consideration of a correlation therebetween, the following evaluation function $D_N$ is yielded.

$$D_N = \sum_{n=0}^{n\max} \sum_{m=0}^{m\max} \left( \frac{\{v(m,n) - \mu_D\}}{\sqrt{\sigma_D^2}} - \frac{\{u(m,n) - \mu_u\}}{\sqrt{\sigma_u^2}} \right)^2 \quad \text{(Equation 12A)}$$

Reducing the evaluation function $D_N$ using the above equation (11) gives an equation $D_N = 2 - 2Cr$. Hence minimizing the value of the evaluation function $D_N$ is equivalent to maximizing the rough matching value Cr. As the rough matching values Cr, showing a correlation between images, becomes larger, similarity in intensity between the images is increased.

In the next step 440, not only the rough matching value Cr but also coordinates g ($m_r$, $n_r$) corresponding to the location ($\xi$, $\epsilon$) of a partial area V having the rough matching value Cr are temporarily stored.

Figure 13:
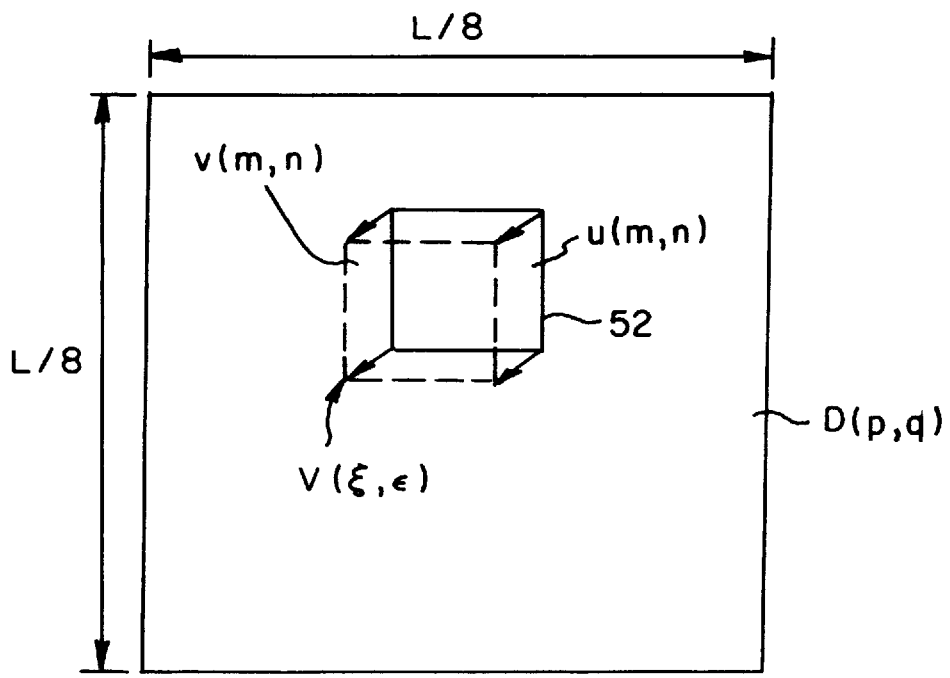
FIG. 13 is a conceptual illustration showing a relationship between an object image and a template image during rough matching.

In the next step 442, it is determined whether or not the scanning of the partial areas V is completed, and if NO, steps 432 to 440 are repeated until the scanning is completed. That is, if the scanning is not completed, the following procedure is repeated: the partial area V is moved through the distance corresponding to eight pixels by incrementing at least one of the coordinates ($\xi$, $\epsilon$) as shown in FIG. 13, and then variance and covariance are found for the new partial area to compute and store the rough matching value Cr.

In the next step 444, a maximum of the rough matching value Cr is selected from the stored rough matching values Cr. The maximum Cr and its associated coordinates g ($m_r$, $n_r$).

Alternatively, a plurality of rough matching values Cr larger than a predetermined value, and a plurality of coordinates g corresponding to the values Cr may be stored.

When the computation of the rough matching value Cr based on the average intensity of the object image 54 is completed, step 410 of FIG. 5 comes. In step 410, whether or not the correlation between the object image 54 and the template image 52 is high is determined by judging whether or not $Cr \geq (th1$ (th1=predetermined threshold). The process goes to step 412 if the correlation is high, and goes to step 420 if the correlation is not high.

Figure 14:
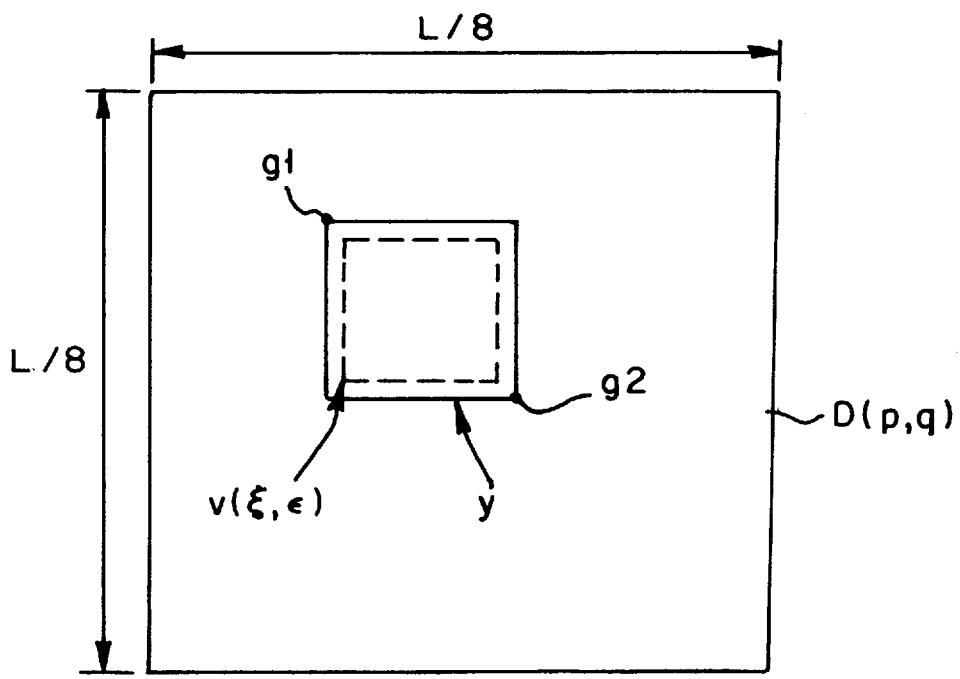
FIG. 14 is a schematic illustration showing a candidate image area which is set when rough matching is done.
Figure 15:
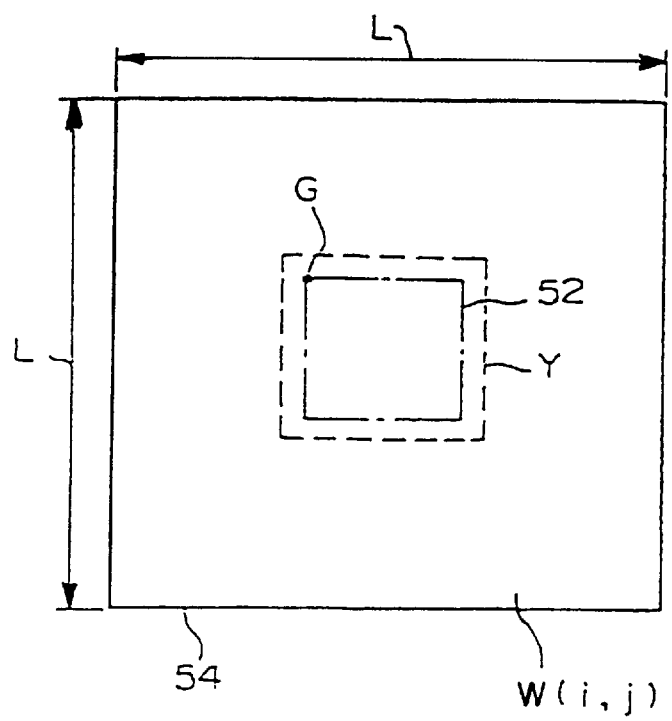
FIG. 15 shows a relationship between a restored candidate image and a template image during fine matching.

If YES in step 410, a candidate image area is set and restored or decompressed in step 412. Namely, an area defined by diagonal coordinates g1 ($m_r-1$, $n_r-1$) and diagonal coordinates g2 ($m_r+M/8+1$, $n_r+M/8+1$) are obtained as shown in FIG. 14. A block having two corner points with the coordinates g1 and g2 on a diagonal is a candidate image area y. This candidate image area is restored with the above equation (7) to obtain image data $W_r$ (i, j) for the candidate image area. The restored candidate image area including image data $W_r$ (i, j) is shown by Y in FIG. 15. The image data $W_r$ (i, j) are at least a portion of image data W (i, j) of the object image.

In step 412, the candidate area is preferably set by g1 and g2 to be larger than the partial area associated with the coordinates g ($m_r$, $n_r$). In that case, pixel information in regions around the partial area can be taken into consideration in the process of fine matching.

The coefficients for the basic images corresponding to the spatial frequencies may be predetermined to restore the candidate image area to a preset degree of definition.

That is, in the above equation (7), the upper bound of summation is set to seven (the number of additions is eight), and i and j range from zero to seven; however, i and j may be set to range from zero to four, and consequently, only components with low spatial frequencies can be restored. As described above, reducing the number of coefficients used for IDCT enables computation load to be reduced.

Reduction of high-spatial frequency components decrease the amount of information on the restored image but does not cause the shape (contour) of the image pattern to be heavily deformed.

In the next step 414, the image data $W_r$ (i, j) of the restored candidate image and detail information (the average $\mu_s$ and the variance $\sigma_s^2$) of the template image 52 are used to do fine pattern matching. That is, by scanning object areas of the restored candidate image one after another, which areas correspond to the size (M×M) of the template image 52, fine matching values C based on pixel information is computed for each of the object areas to find a maximum of the fine matching value C in all the object areas.

Figure 7:
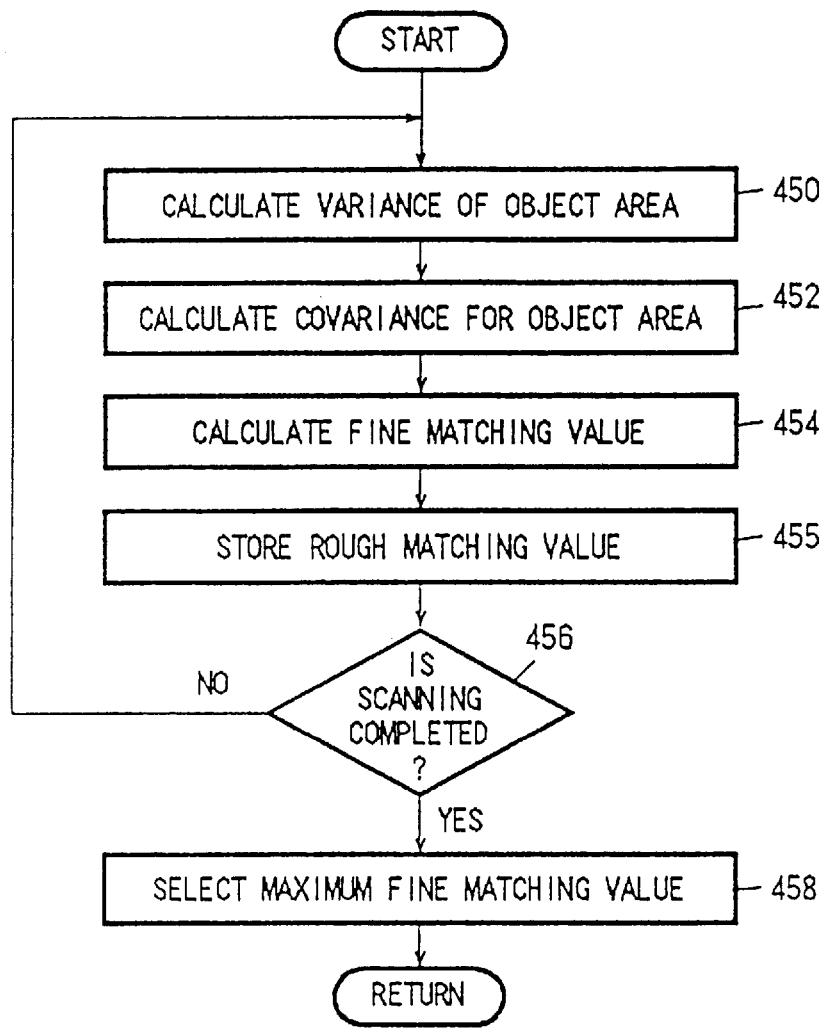
FIG. 7 is a flowchart showing the flow through a routine for computing a fine matching value.

In step 414, the fine matching value computing routine in FIG. 7 is executed. In step 450 of FIG. 7, as in the process for the rough matching value Cr, the location ($\xi$, $\epsilon$) of an object area in the restored candidate image area Y is set. The object area has a size corresponding to the size (M×M) of the template image 52. The variance $\sigma_w^2$ of the object area set is computed according to the following equations (13) and (14), using the image data $W_r$ (i, j).

$$\mu_W = \frac{\sum_{j=0}^{j\max} \sum_{i=0}^{i\max} \omega(i,j)}{i\max \cdot j\max} \quad \text{(Equation 13)}$$

$$\sigma_W^2 = \frac{\sum_{j=0}^{j\max} \sum_{i=0}^{i\max} \{\omega(i,j) - \mu_W\}^2}{i\max \cdot j\max} \quad \text{(Equation 14)}$$

where $\omega(m, n) = W_r(\xi+i, \epsilon+j)$ i max = j max = M-1

In the next step 452, the image data $W_r$ (i, j) on the restored candidate image and the image data S (i, j) of the template image 52 are used to compute the covariance $\sigma_{WS}^2$ according to the following equation (15):

$$\sigma_{WS}^2 = \frac{\sum_{j=0}^{j\max} \sum_{i=0}^{i\max} \{\omega(i,j) - \mu_W\}\{S(i,j) - \mu_s\}}{i\max \cdot j\max} \quad \text{(Equation 15)}$$

In the next step 454, the variance $\sigma_W^2$ and covariance $\sigma_{WS}^2$ are used to compute a fine matching value C with respect to the intensity of each pixel according to the following equation (16):

$$C = \frac{\sigma_{WS}^2}{\sqrt{(\sigma_W^2 \sigma_S^2)}} \quad \text{(Equation 16)}$$

Similarly to the rough matching in step 408, equation (16) shows that as the fine matching value C, showing a correlation in terms of pixel intensity, becomes larger, the images become more similar. In the next step 455, the fine matching value C computed and coordinates G ($i_f$, $j_f$) are temporarily stored.

In the next step 456, it is determined whether or not the scanning of all object areas of the restored candidate image, which areas correspond to the size (M×M) of the template image 52, is completed, and if NO, steps 450 to 454 are repeated until the scanning is completed. That is, if the scanning is not completed, the following procedure is repeated: at least one of the coordinates (i, j) is incremented, and then variance and covariance are obtained to compute and store the fine matching value C.

In the next step 458, a maximum of the fine matching value C is selected from the stored fine matching values C. The maximum C and its associated coordinates G ($i_f$, $j_f$) are stored as the fine matching value C and the coordinates G for the object image 54.

Alternatively it is also possible to store a plurality of fine matching values C larger than a predetermined value, and their associated coordinates G.

When the computation of the fine matching value C from pixel intensity is completed, step 416 of FIG. 5 comes. In step 416, whether or not the correlation between the object image 54 and the template image 52 is high is determined by judging whether or not $Cr \geq th2$ (th2=predetermined threshold). If YES, the coordinates G ($i_f$, $j_f$) representing the location of the object area is output as the coordinates of an image area where the template image 52 has the closest correlation with the object image 54. On the other hand, if NO, the process goes to step 420. If there is another object image 54 to be processed, the process returns to step 404, the routine is completed.

By displaying the image data W (i, j) of the object image 54 including the object area associated with coordinates G ($i_f$, $j_f$), with the object area being marked, the results of recognition can be shown to the operator as an image.

Figure 16:
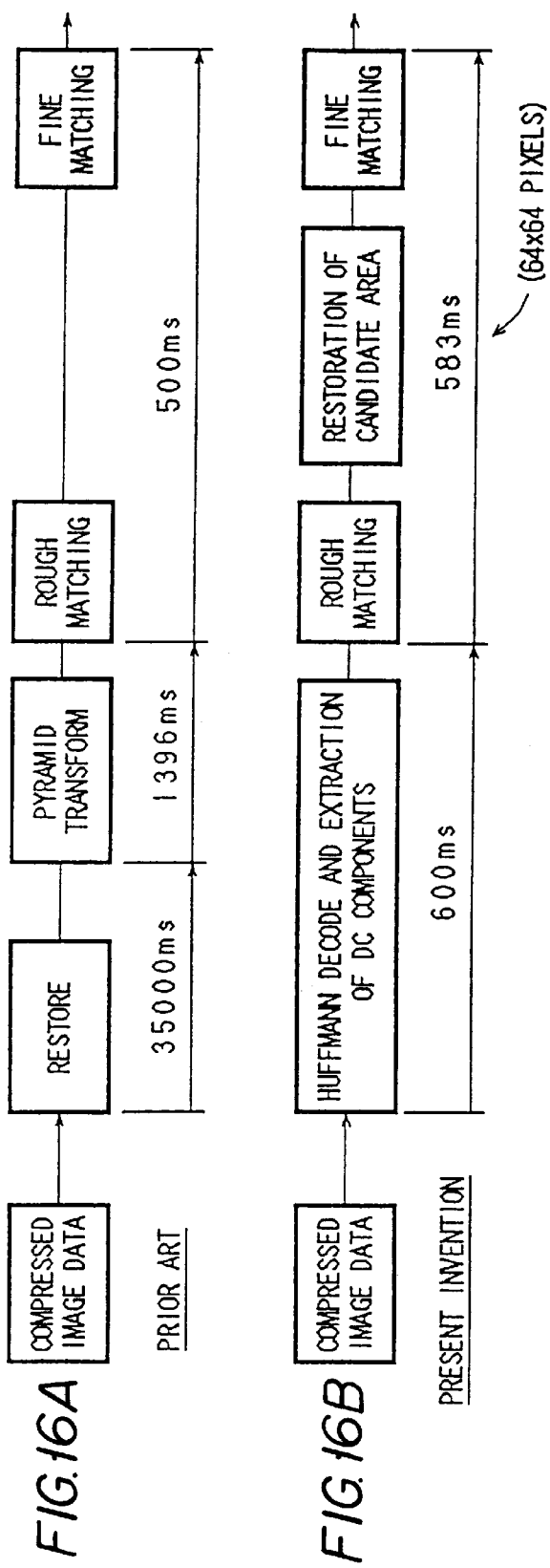
FIG. 16A and 16B shows a comparison of computation load involved in image recognition between an image recognition system according to the present invention and a prior image recognition system.

FIG. 16 shows a comparison of computation load in recognizing a template image using software with respect to a 512-pixel×480-pixel image (eight bits per pixel) between an image recognition system according to the embodiment and a prior system restoring all compressed images before recognition. Pyramid transform used in the prior system is a process to compute the average intensity for each block of 8-pixel×8-pixel size.

The prior system took 35000 ms to restore an image from the compressed image data, 1396 ms to perform the pyramid transform, and 500 ms to do rough pattern matching and fine pattern matching.

In contrast, an image recognition system according to the embodiment took 600 ms to do Huffmann decoding and extract DC components from the compressed image data and 583 ms to do rough matching, restore a candidate area selected by rough matching, and perform fine matching. In the embodiment, the size of the candidate area has been set to 64 pixels×64 pixels when rough matching is done.

The results show that the prior system requires 36896 ms, while the system according to the embodiment requires 1683 ms; that is, computation load is reduced to $\frac{1}{22}$.

In this manner, the DC coefficients can directly be referred to with the image data of the object image 54 being compressed and thus there is no need for restoring the compressed image data before rough pattern matching. Thus the amount of computations can be significantly reduced.

In addition, restoring only the image of a candidate area during fine pattern matching dispenses with restoration of all compressed image data, thus minimizing cost necessary for restoration. Limiting the number of coefficients, used for restoration, as a function of required accuracy further reduces process cost.

A second embodiment of the present invention is described below. The second embodiment is an application of the present invention to an image recognition system which compresses images, captured with a TV camera, by the JPEG technique to save memory space and searches the compressed images for an object image substantially similar to a non-compressed set image. Since the second embodiment has an analogous arrangement to the first embodiment, like elements are given like reference numbers, and detailed description is omitted.

Figure 17:
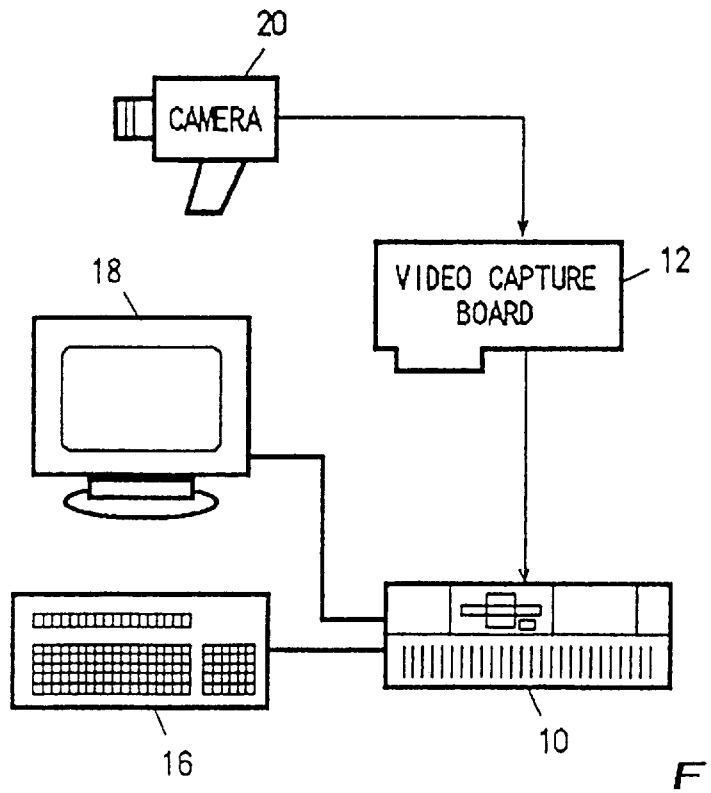
FIG. 17 is a configuration view showing an image recognition system according to a second embodiment.
Figure 18:
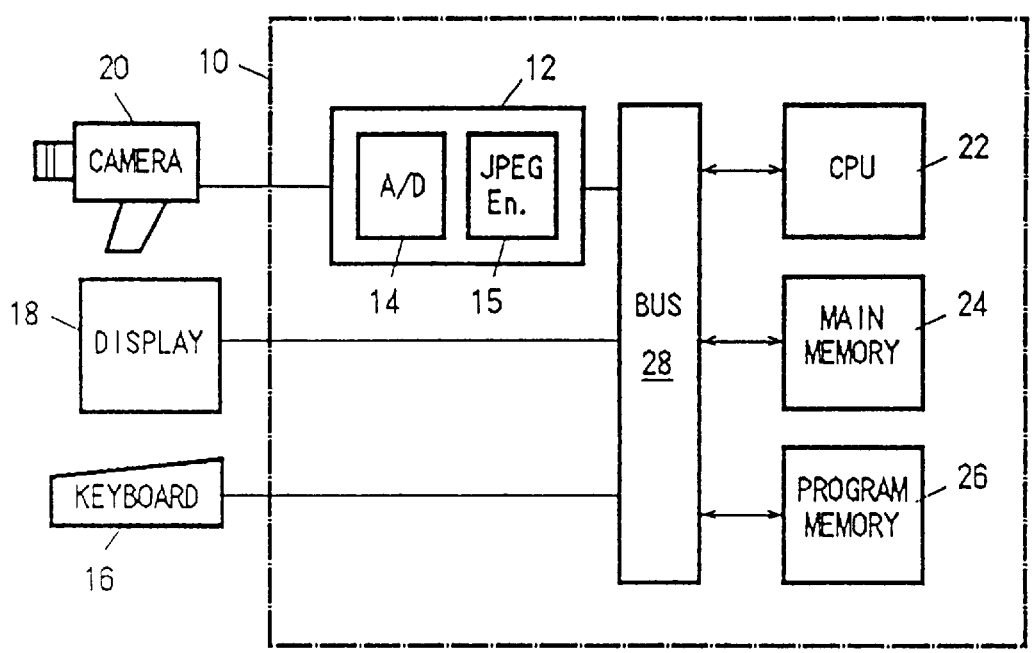
FIG. 18 is a block diagram showing functional connections in an image recognition system according to the second embodiment.

As shown in FIGS. 17 and 18, a general-purpose personal computer 10 is equipped with a video capture board 12 connected with a TV camera 20, which performs processing operations such as image compression as described in the first embodiment. The video capture board 12 is connected to a bus 28 and the TV camera 20. The video capture board 12 includes an analog/digital (A/D) converter 14, converting image signals shot with the TV camera 20 into digital signals, and an image data compressor 15 (JPEG$_{13}$Encoder) producing compressed image data $\Phi$ by compressing the digitized image data. The video capture board 12 extracts a TV signal corresponding to one image (e.g., one-frame image) from output signals from the TV camera 20 and compresses the TV signal. The bus 28 is connected to a display 18 and a keyboard 16. To simplify description, an image shown in FIG. 21 is taken as an object image 55.

The video capture board 12 may include a separate digital signal processor for processing audio and video information.

Not only the TV camera but other equipment generating video signals (e.g., NTSC signals), such as laser disc system may be connected to the video capture board 12.

Figure 19:
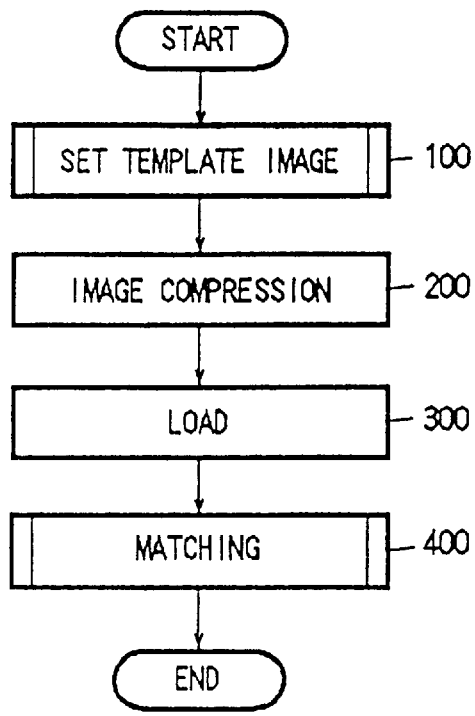
FIG. 19 is a flowchart showing the flow through a main control routine according to the second embodiment.
Figure 20:
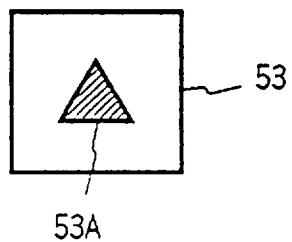
FIG. 20 diagrammatically illustrates a template image according to the second embodiment.
Figure 21:
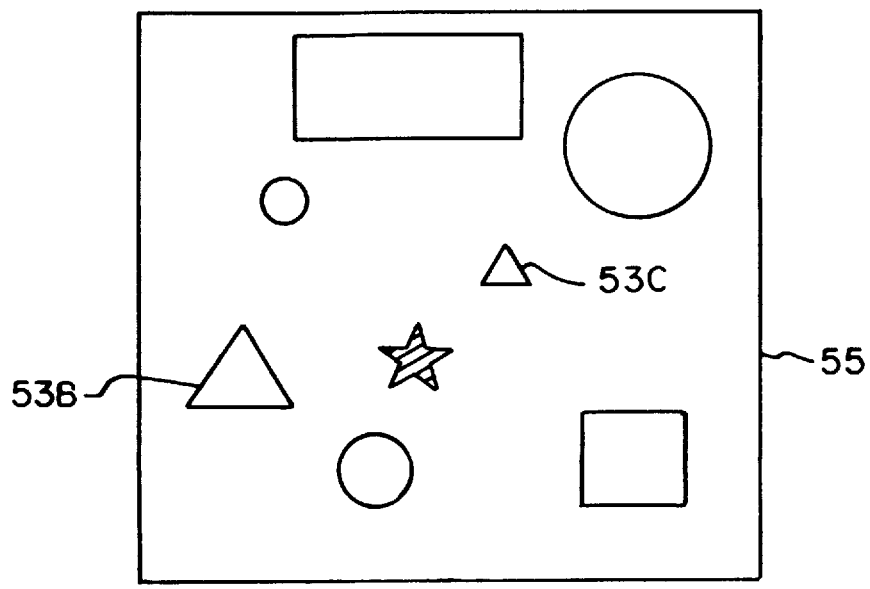
FIG. 21 diagrammatically illustrates an object image according to the second embodiment.

Referring now to FIGS. 19 to 21, processing by an image recognition system according to the embodiment is described. When image recognition starts, a main control routine in FIG. 19 is executed, and in step 100, a template image is set as a reference for image recognition as in the first embodiment. As shown in FIG. 20, in the embodiment, an image which shows the shape of an object 53A to be searched for is set as a template image 53, and image data S on the template image 53 are stored in main memory 24.

The template image 53 set is pre-processed as described hereinabove, and the average intensity u (m, n) of each of the 8-pixel×8-pixel blocks is computed from the above equation (1). In addition, the average $\mu_u$ and the variance $\sigma_u^2$ of average intensity are computed to obtain rough information on the template image 53. The average $\mu_s$ and variance $\sigma_s^2$ of pixel intensity are computed using image data S (i, j) to obtain detail information on the template image 53.

When the setting of the template image 53 is completed as described above, step 200 of FIG. 19 comes and the object image 55 shot with the TV camera 20 is compressed. The image compression in step 200 is a combination of orthogonal transform, quantization, and coding in accordance with the well-known JPEG technique described with respect to the first embodiment, and the object image shot with the TV camera 20 is processed at the video capture board 12.

When the image compression is completed in step 200, the compressed image data $\Phi$ are output from the video capture board 12 and loaded into main memory 24 in the next step 300.

In the next step 400, the template image 53 is used to recognize the object image 55 corresponding to the compressed image data $\Phi$ stored in main memory 24. Since the object image 55 is recognized in the same way as in the image matching routine of FIG. 5, detailed description is omitted.

The object image 55 includes objects 53B and 53C similar in shape to the object 53A in the template image 53 as shown in FIG. 21. However, since the average intensity, variance $\sigma_D^2$, and covariance $\sigma_{Du}^2$ of each of the blocks are used to compute the rough matching value Cr from the equation (11), the rough matching value Cr for the object 53C which is more closely correlated with the object 53A will have a larger value.

As a result, a candidate image area including the object 53C is restored and fine pattern matching is performed with respect to the restored candidate image area in a similar manner to that described in connection with step 414. When the fine matching value C is maximized, the object area containing the more closely correlated object 53C is recognized, and its associated coordinates G ($i_f$, $j_f$) are stored.

This enables matching between the object image 55 and the template image 52 and the coordinates of the object area in the object image 55 to be detected.

Moreover, by displaying the image data W (i, j) of the object image including the object area associated with the coordinates G ($i_f$, $j_f$), with the object area being marked, the results of recognition can be shown to the operator as an image.

Since the present invention does not require full restoration of compressed image data, it is suitable for equipment required to operate at high speeds. The present invention will also find utility in the industrial image recognition for automatic object handling and positioning systems, automatic defect inspection systems, character recognition systems and image measuring systems.

As described above, the present invention finds use in any application where correspondence between a non-compressed image and a compressed image is checked by matching. The present invention is not limited to still images but can be applied to moving images. For moving images, compressed data compressed by MPEG technique, including audio information, will be available.

Since images do not necessarily have a standard intensity, image information normalized by the normalization correlation method or the like is preferably used. Normalization may be performed for the average intensity for each of block represented by DC components, or the restored candidate image after rough matching.

As described above, according to the present invention, DC components of compressed image data are utilized for rough matching and it is not necessary to restore or decompress all compressed data, and consequently, computation load can be greatly reduced.

I claim:

1. An image recognition method for detecting matching between a non-compressed image and a compressed image, said compressed image being stored in memory as image data which are compressed using orthogonal transform into a two-dimensional spatial frequency region, said compressed image data including, for each of blocks each comprising a predetermined number of pixels, a DC component corresponding to the average intensity of the respective block, said image recognition method comprising the steps of:

dividing said non-compressed image into blocks corresponding in size to said blocks in said compressed image;

computing the average intensity for each of the blocks of said non-compressed image;

sequentially extracting DC components for a plurality of partial areas from said compressed image data, said partial areas corresponding in size to said non-compressed image;

computing a rough matching value indicative of the degree of matching between said non-compressed image and said compressed image based on said DC components of said partial areas and the average intensity of said blocks in said non-compressed image;

determining a candidate area based on said rough matching value and restoring compressed image data corresponding to said candidate area to obtain candidate image data;

computing a fine matching value indicative of the degree of matching between said candidate image and said non-compressed image based on the image data for said candidate image and the image data for said non-compressed image; and determining based on said fine matching value whether or not said non-compressed image matches said compressed image.

2. The image recognition method according to claim 1, wherein said rough matching value is computed based on the correlation between each of said partial areas and said non-compressed image with respect to the average intensity by the block.

3. The image recognition method according to claim 1, wherein said fine matching value is computed based on the correlation between said candidate image and said non-compressed image with respect to the intensity by the pixel.

4. The image recognition method according to claim 1, wherein said intensity is the intensity of a predetermined color.

5. The image recognition method according to claim 1, further including the step of predetermining a reference value for each of said rough and fine matching, and the step of determining that the images do not match if at least one of said rough and fine matching values is smaller than the corresponding reference value.

6. The image recognition method according to claim 1, wherein the intensity of the compressed image is normalized.

7. The image recognition method according to claim 1, wherein said candidate area is restored correspondingly to a preset spatial frequency region.

8. An image recognition apparatus which detects matching between a non-compressed image and a compressed image, said compressed image being stored in memory as image data which are compressed using orthogonal transform into a two-dimensional spatial frequency region, said compressed image data including, for each of blocks each comprising a predetermined number of pixels, a DC component corresponding to the average intensity of the respective block, said image recognition apparatus comprising:

means for dividing said non-compressed image into blocks corresponding in size to said blocks in said compressed image, means for computing the average intensity for each of the blocks of said non-compressed image, means for sequentially extracting DC components for a plurality of partial areas from said compressed image data, said partial areas corresponding in size to said non-compressed image;

means for computing a rough matching value indicative of the degree of matching between said non-compressed image and said compressed image based on said DC components of said partial areas and the average intensity of said blocks in said non-compressed image;

means for determining a candidate area based on said rough matching value and for restoring compressed image data corresponding to said candidate area to obtain candidate image data;

means for computing a fine matching value indicative of the degree of matching between said non-compressed image and said candidate image based on the image data for said candidate image and the image data for said non-compressed image; and means for determining based on said fine matching value whether or not said non-compressed image matches said compressed image.

9. An image recognition method for detecting matching between a non-compressed image and a compressed image, said compressed image being stored in memory as image data which are compressed using orthogonal transform into a two-dimensional spatial frequency region, said compressed image data including, for each of blocks each comprising a predetermined number of pixels in the original uncompressed image, a DC component corresponding to the average intensity of the respective block, said image recognition method comprising the steps of:

dividing said non-compressed image into one or more blocks corresponding in size to said blocks in said compressed image;

computing the average intensity for each of the blocks of said non-compressed image;

extracting DC components from said compressed image;

performing rough matching between said non-compressed image and said compressed image based on the DC components extracted from said compressed image and the average intensity computed for each of the blocks of said non-compressed image;

restoring the compressed image when the degree of matching in the rough matching exceeds a predetermined threshold;

performing a fine matching between said non-compressed image and said restored image based on the image data for said restored image and the image data for said non-compressed image; and determining, based on the result of said fine matching, whether or not said non-compressed image matches said compressed image.

10. An image recognition apparatus which detects matching between a non-compressed image and a compressed image, said compressed image being stored in memory as image data which are compressed using orthogonal transform into a two-dimensional spatial frequency region, said compressed image data including, for each of blocks each comprising a predetermined number of pixels in the original uncompressed image, a DC component corresponding to the average intensity of the respective block, comprising:

means for dividing said non-compressed image into one or more blocks corresponding in size to said blocks in said compressed image;

means for computing the average intensity for each of the blocks of said non-compressed image;

means for extracting DC components from said compressed image;

means for performing rough matching between said non-compressed image and said compressed image based on the DC components extracted from said compressed image and the average intensity computed for each of the blocks of said non-compressed image;

means for restoring the compressed image when the degree of matching in the rough matching exceeds a predetermined threshold;

means for performing a fine matching between said non-compressed image and said restored image based on the image data for said restored image and the image data for said non-compressed image; and means for determining, based on the result of said fine matching, whether or not said non-compressed image matches said compressed image.

* * * * *